(12) United States Patent
Hageman et al.

(10) Patent No.: US 7,861,814 B2
(45) Date of Patent: Jan. 4, 2011

(54) AIR INTAKE SYSTEM WITH FLOW-DIVERTING PLENUM BOX

(75) Inventors: Andrew Joseph Hageman, Dyersville, IA (US); Gregory Francis Swift, Dubuque, IA (US)

(73) Assignee: Deere & Company, Moline, IL (US)

( * ) Notice: Subject to any disclaimer, the term of this patent is extended or adjusted under 35 U.S.C. 154(b) by 432 days.

(21) Appl. No.: 12/228,084

(22) Filed: Mar. 6, 2008

(65) Prior Publication Data
US 2009/0229685 A1    Sep. 17, 2009

Related U.S. Application Data

(63) Continuation-in-part of application No. 12/042,656, filed on Mar. 5, 2008.

(51) Int. Cl.
*B60K 11/00*    (2006.01)
(52) U.S. Cl. .................................. 180/68.1; 180/68.3
(58) Field of Classification Search .............. 180/68.3, 180/68.2, 68.1, 69.24, 309; 123/41.31, 41.49
See application file for complete search history.

(56) References Cited

U.S. PATENT DOCUMENTS

| | | | | |
|---|---|---|---|---|
| 3,207,250 | A | * | 9/1965 | Bamford ................ 180/68.4 |
| 4,086,976 | A | * | 5/1978 | Holm et al. ............ 180/68.1 |
| 4,341,277 | A | * | 7/1982 | Adamson et al. ....... 180/68.1 |
| 4,689,060 | A | * | 8/1987 | Koske .................. 180/68.1 |
| 4,932,490 | A | | 6/1990 | Dewey |
| 5,656,050 | A | | 8/1997 | Moredock |
| 5,766,315 | A | | 6/1998 | Moredock |
| 6,319,304 | B1 | | 11/2001 | Moredock |
| 6,338,745 | B1 | | 1/2002 | Moredock et al. |
| 6,406,506 | B1 | | 6/2002 | Moredock et al. |
| 6,425,943 | B1 | | 7/2002 | Moredock |
| 6,427,798 | B1 | * | 8/2002 | Imashige ................ 180/309 |
| 6,655,486 | B2 | * | 12/2003 | Oshikawa et al. ......... 180/68.1 |
| 7,056,368 | B2 | | 6/2006 | Moredock et al. |
| 7,143,852 | B2 | * | 12/2006 | Yatsuda et al. .......... 180/69.2 |
| 7,204,329 | B2 | | 4/2007 | Pfohl et al. |
| 7,320,299 | B2 | * | 1/2008 | Eavenson et al. ........ 123/41.49 |
| 7,559,295 | B2 | * | 7/2009 | Yamada et al. .......... 123/41.31 |
| 7,690,460 | B2 | * | 4/2010 | Sakitani et al. .......... 180/68.1 |
| 2005/0172587 | A1 | | 8/2005 | Moredock et al. |

FOREIGN PATENT DOCUMENTS

EP    1204450 B1    9/2000

OTHER PUBLICATIONS

Diversafab article dated Feb. 15, 2008 (3 pages).
12M Motor Grader, CAT® brochure (28 pages) (May 2007).
120M Motor Grader, CAT® brochure (28 pages) (Jun. 2007).
160M Motor Grader, CAT® brochure (28 pages) (May 2007).

* cited by examiner

*Primary Examiner*—Hau V Phan

(57) ABSTRACT

A work machine comprises an external housing, an air precleaner, an air filter, and a plenum box. The air precleaner is positioned outside the external housing, and the air filter is positioned inside the external housing. The plenum box is coupled fluidly to the air precleaner and the air filter for communication of intake air from the air precleaner to the air filter through the plenum box.

16 Claims, 5 Drawing Sheets

AIR INTAKE SYSTEM WITH FLOW-DIVERTING PLENUM BOX

FIELD OF THE DISCLOSURE

The present disclosure relates to an air intake system with an air precleaner and an air filter.

BACKGROUND OF THE DISCLOSURE

There are air intake systems for engines and cabs which include an air precleaner and an air filter. The air precleaner separates particles from uncleaned air by centrifugal force (e.g., dirt, dust, chaff, sand, moisture, rain, snow, debris, and other relatively heavy particles), and the air filter has filtration media that collects particles (e.g., relatively light particles and heavier particles not removed by the precleaner) from the air partially cleaned by the precleaner, prior to ingestion by the engine or discharge into the cab.

As is well known in the art, there are various types of air precleaners, including, for example, collection bowl precleaners, aspirated precleaners, and atmosphere discharge (or ejector or ejective) precleaners. There are powered and non-powered precleaners, such as, for example, powered and non-powered ejective precleaners.

In the context of off-road machines (e.g., motor graders), it is common for such machines to have an air precleaner (e.g., ejective precleaner of the non-powered type) mounted above the hood of the engine compartment to allow intake air for the engine to be drawn from atmosphere outside the engine compartment. Often, the precleaner is mounted atop an intake tube projecting above the hood, and the precleaner is positioned such that it does not obstruct the visibility of the operator from the operator's station (e.g., laterally offset from a fore-aft midline of the machine and usually in-line with an exhaust stack in the fore-aft dimension). However, the position of the air filter within the engine compartment is constrained by other components within the engine compartment. The precleaner outlet of the precleaner and the filter inlet of the filter are thus typically offset from one another, at least laterally.

There have been machines (e.g., motor graders) that use bent tubing for the intake tube (e.g., somewhat S-shaped), above the hood in some cases and below the hood in other cases, to allow the precleaner to be positioned in a desirable location for visibility (e.g., laterally offset from a fore-aft midline of the machine and usually in-line with an exhaust stack in the fore-aft dimension) and still be able to route air from the precleaner outlet to the filter inlet. Using such bent tubing to direct air flow limits where the precleaner can be positioned due to the manufacturing constraints associated with tube bending (e.g., minimum bend radius, distance between ends).

SUMMARY OF THE DISCLOSURE

According to the present disclosure, there is provided a work machine comprising an external housing and an air intake system. The air intake system comprises an air precleaner, an air filter, and a plenum box. The air precleaner is positioned outside the external housing and comprises a precleaner outlet port. The air filter is positioned inside the external housing and comprises a filter inlet port. The precleaner outlet port and the filter inlet port are offset from one another in a fore-aft dimension of the work machine or a lateral dimension of the work machine, or both dimensions. The plenum box is coupled fluidly to the precleaner outlet port and the filter inlet port for communication of intake air from the air precleaner to the air filter through the plenum box. The plenum box may thus be used to promote an operator's overall visibility of the machine surroundings from the operator's station of the work machine. It may further allow for efficient use of available space.

The plenum box may comprise a plenum inlet port coupled fluidly to the precleaner outlet port and a plenum outlet port coupled fluidly to the filter inlet port. The plenum inlet and outlet ports may be offset from one another in the fore-aft dimension or the lateral dimension, or both dimensions.

Exemplarily, the air precleaner may be offset laterally from a fore-aft midline of the work machine to promote visibility. In such a case, the precleaner outlet port and the filter inlet port may be offset from one another in the lateral dimension of the work machine, and the plenum inlet port and the plenum outlet port may be offset from one another in the lateral dimension of the work machine. Further, the precleaner outlet port and the plenum inlet port may be aligned vertically with one another, and the plenum outlet port and the filter inlet port may be aligned vertically with one another.

The above and other features will become apparent from the following description and the attached drawings.

BRIEF DESCRIPTION OF THE DRAWINGS

The detailed description of the drawings refers to the accompanying figures in which.

DESCRIPTION OF THE DRAWINGS

Figure 1:
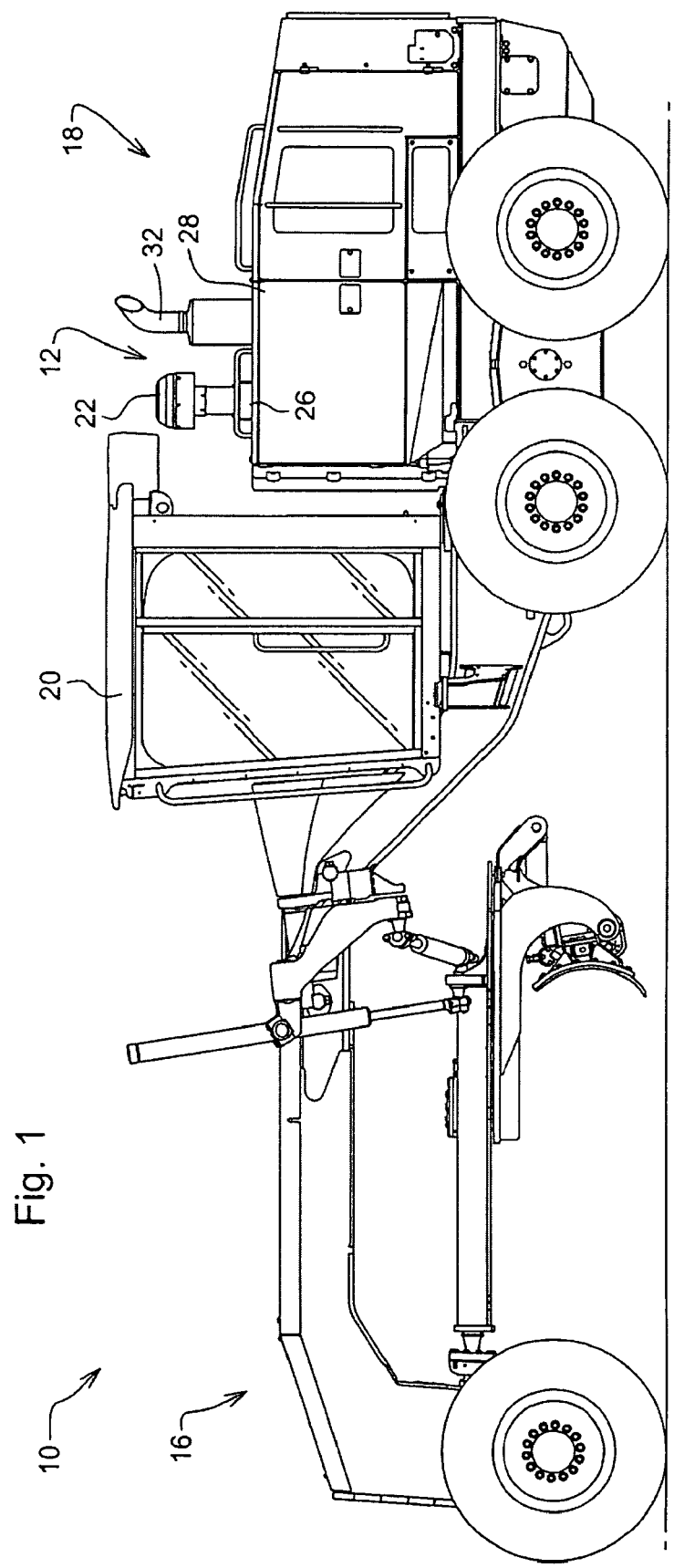
FIG. 1 is side elevation view showing a work machine in the form of, for example, a motor grader.
Figure 2:
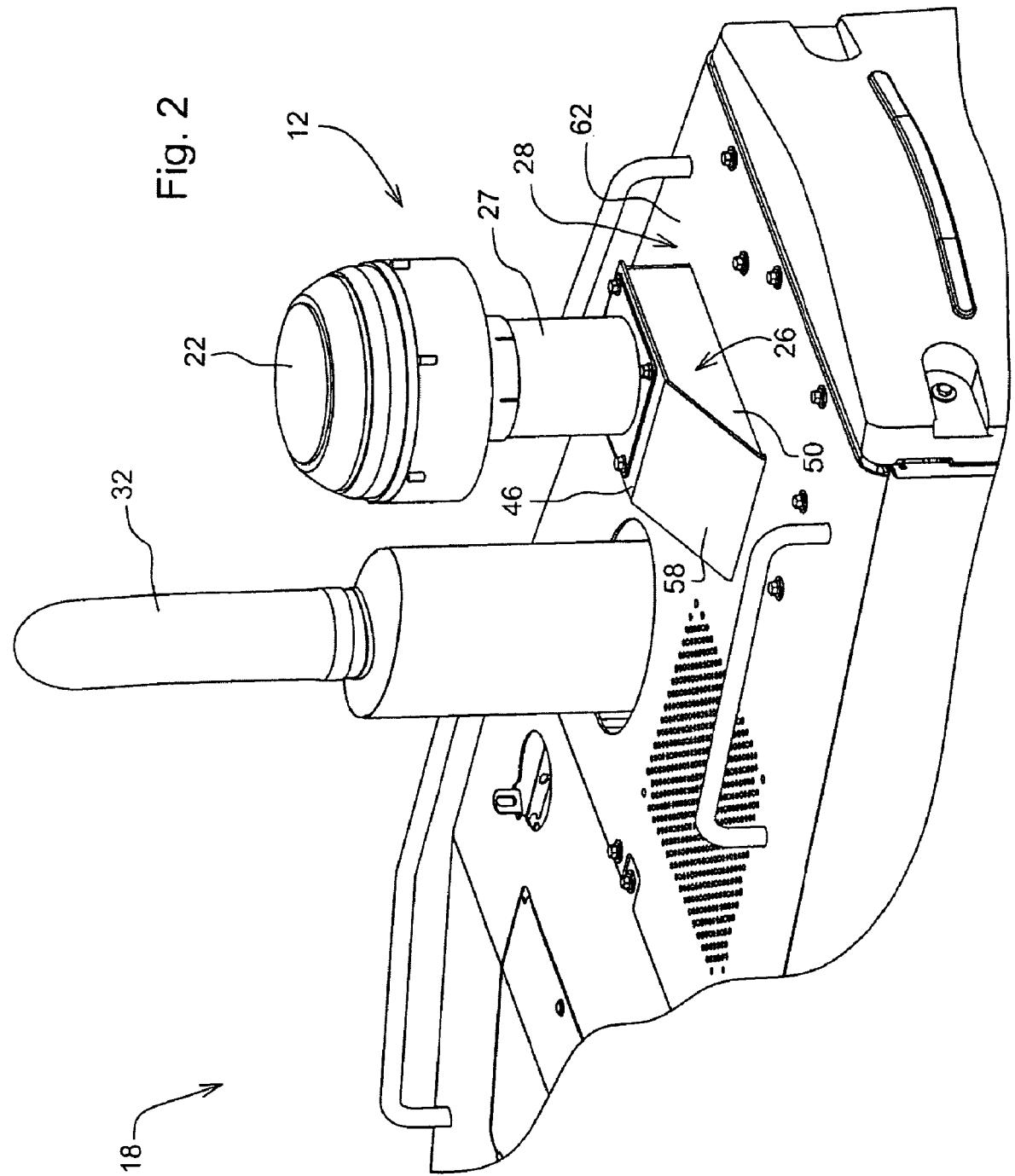
FIG. 2 is a perspective view showing a plenum box underlying an air precleaner to receive intake air therefrom.
Figure 3:
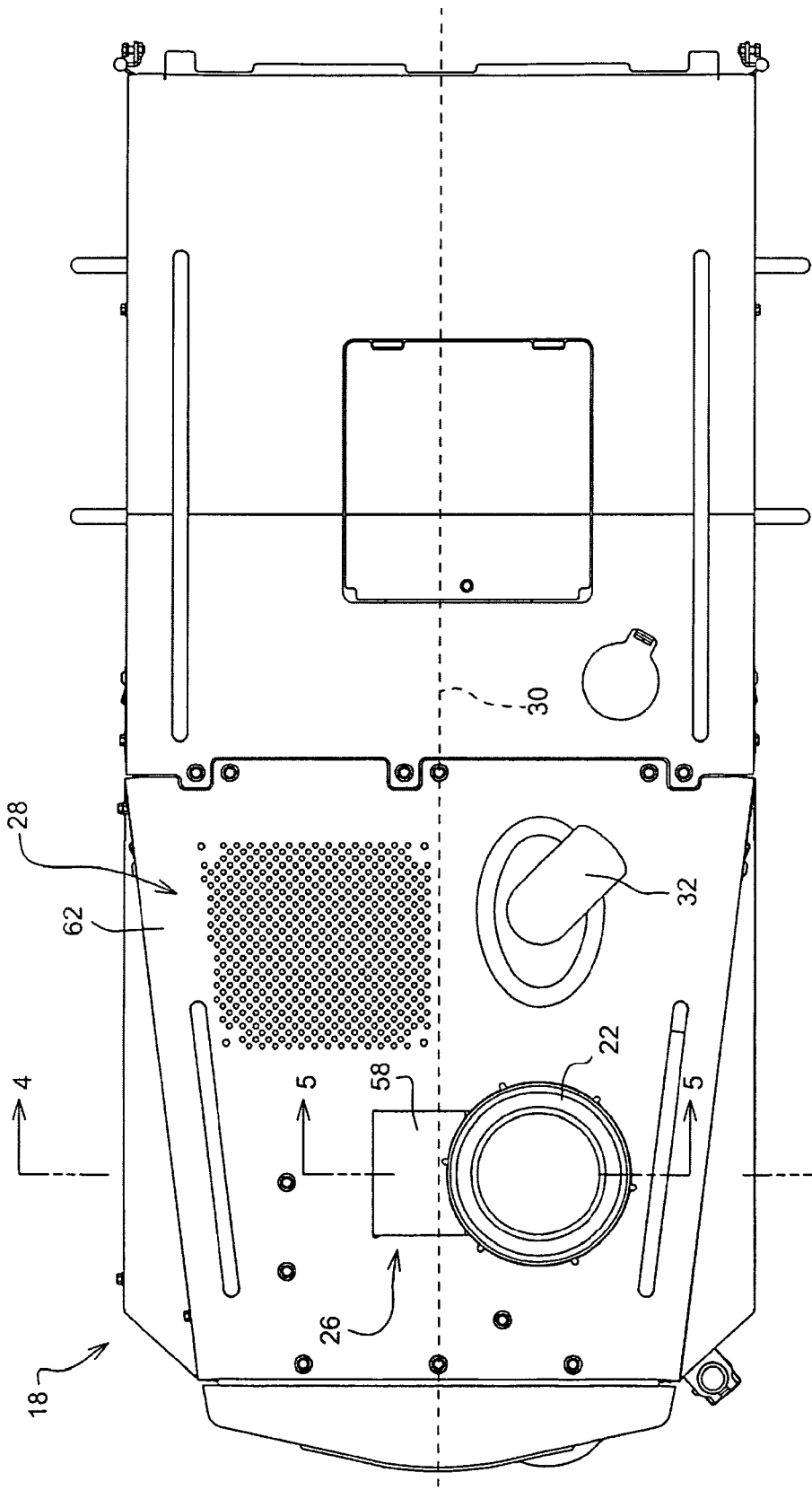
FIG. 3 is a plan view of a rear section of the work machine showing the air precleaner offset laterally in a fore-aft midline of the work machine in a manner aligned with an exhaust stack of the work machine, promoting an operator's overall visibility from the operator's station.
Figure 4:
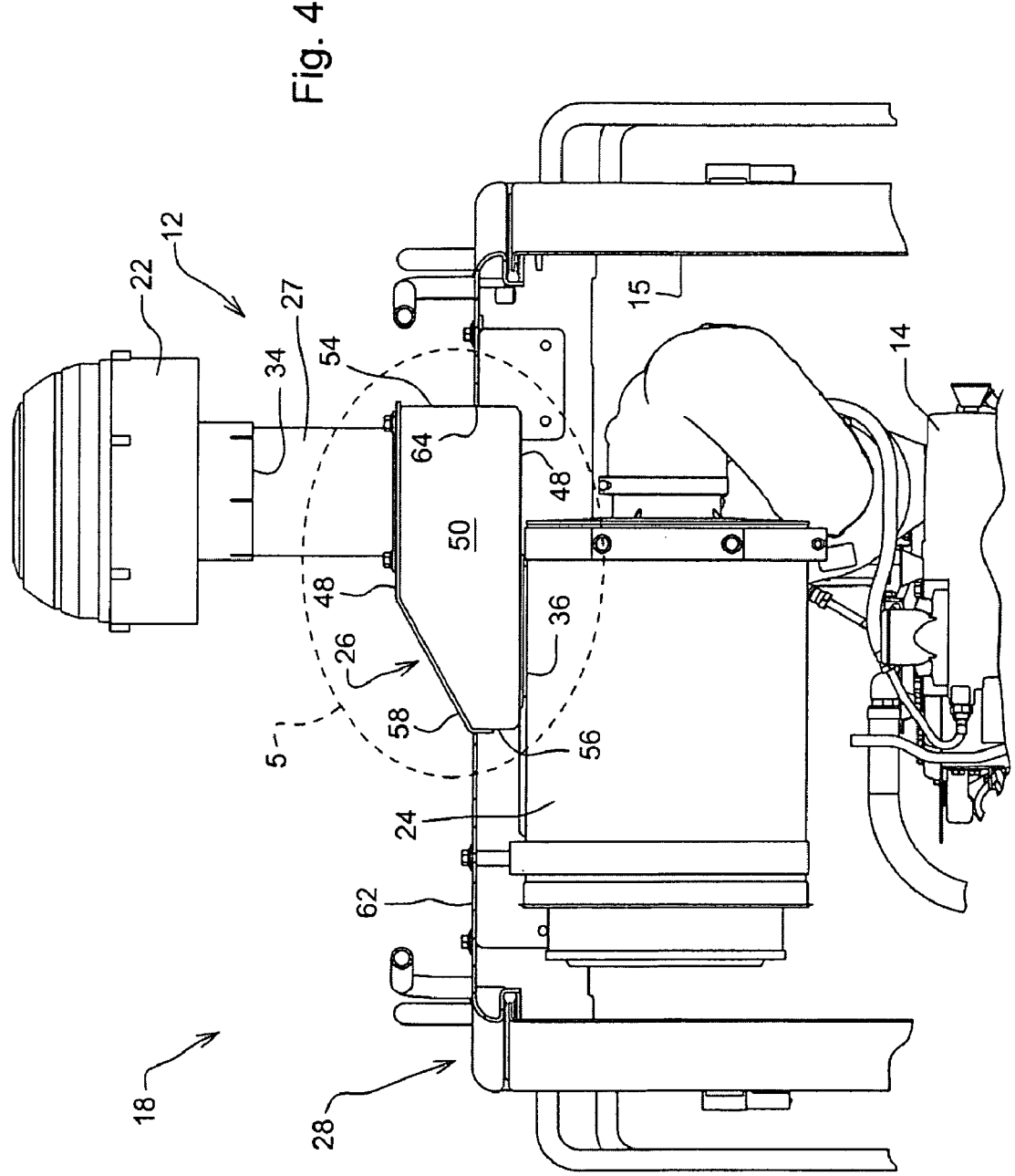
FIG. 4 is a sectional view, taken along lines 4-4 of FIG. 3, showing the plenum box coupled fluidly to the air precleaner, positioned outside an external housing of the work machine, and coupled fluidly to an air filter, positioned inside the external housing (e.g., positioned inside the engine compartment), for communication of intake air from the air precleaner to the air filter through the plenum box.

Referring to FIGS. 1-4, there is shown a work machine 10, exemplarily a motor grader, having an air intake system 12 for providing intake air to an engine 14 located in an engine compartment 15 within an external housing 28 of the work machine 10 (FIG. 4). In the case of a motor grader (e.g., qualified under Tier III of Environmental Protection Agency emissions regulations), the grader has articulated front and rear sections 16, 18. The operator's station 20 (e.g., cab) is part of the front section 16, and the air intake system 12 is part of the rear section 16. The engine 14 provides the power for propulsion of the machine 10, and powers the onboard hydraulics. The cooling system may also be located within housing 28, such as to the rear of the engine compartment 15.

The air intake system 12 has an air precleaner 22, an air filter 24 (FIG. 4), and a plenum box 26. The air precleaner 22 is positioned outside the external housing 28 of the work machine 10. The air filter 24 is positioned inside the external housing 28. The plenum box 26 is coupled fluidly to the precleaner 22 and the filter 24 for communication of intake air from the precleaner 22 to the filter 24 through the plenum box 26.

The precleaner 22 is, for example, a non-powered ejective precleaner. As such, it has stationary vanes and a rotatable impeller. The vanes direct uncleaned, ambient air toward the impeller which is rotated by the incoming flow of air. The impeller generates a swirling motion in the air and accelerates particles toward the outside of a separation chamber. Slots in the separation chamber allow debris-laden air to exit the precleaner 22 to the atmosphere while the cleaner air exits the precleaner 22 for passage to the air filter 24 via the plenum box 26. The precleaner 22 thus centrifugally separates particles from the intake air. Illustratively, the precleaner 22 is mounted atop a straight intake tube 27 projecting above the plenum box 26. The precleaner 22 may be a model 9002 ejective precleaner manufactured by Sy-Klone International Ltd. of Jacksonville, Fla.

The air filter 24 is located downstream from the precleaner 22 in the air intake system 12. The filtration media of the air filter 24 collects particles to prevent such particles from entering the engine 14. The filter 24 may be cleaned or replaced from time to time. Usage of the precleaner 22 extends such filter service intervals. The air filter 24 may be a model ERB13 air filter manufactured by Donaldson Company, Inc. of Minneapolis, Minn.

Referring to FIGS. 3 and 4, the plenum box 26 is a compact structure, promoting an operator's overall visibility from the operator's station 20. The plenum box 26 minimizes obstructions to the operator's line of sight due to the air intake system 12. Exemplarily, to promote such visibility, the precleaner 22 may be offset from a fore-aft midline 30 of the work machine 10 in a lateral dimension of the machine 10, and may also be aligned with an exhaust stack 32 of the machine 10 in a fore-aft dimension of the machine 10. The plenum box 26 may be used to connect a precleaner outlet port 34 of the precleaner 22 and a filter inlet port 36 of the filter 24 in such an offset arrangement.

Figure 5:
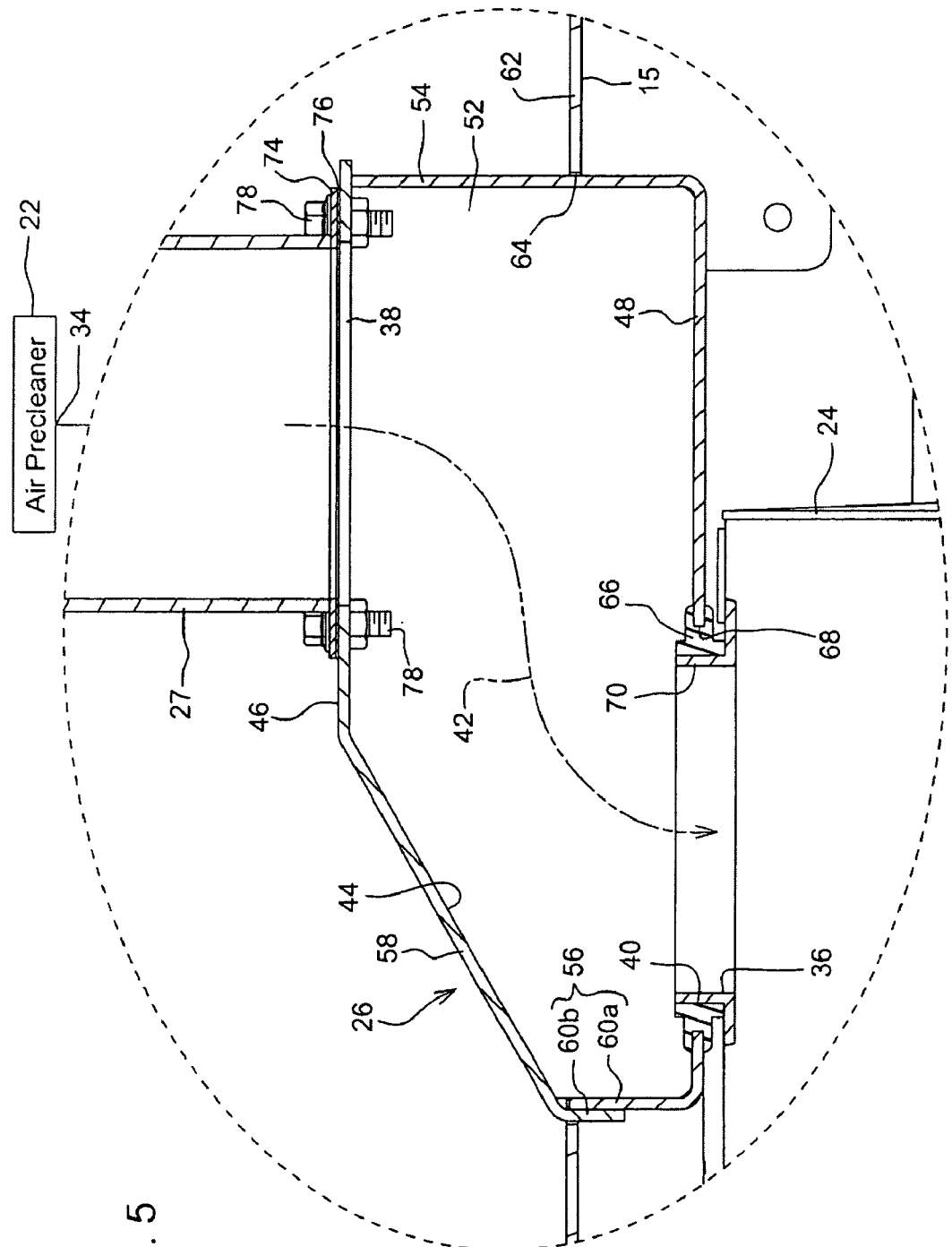
FIG. 5 is an enlarged sectional view taken along lines 5-5 of FIG. 3 of the plenum box shown in region 5 of FIG. 4.

Referring to FIG. 5, various ports of the air intake system 12 may be offset from one another. For example, the precleaner outlet port 34 and the filter inlet port 36 may be offset from one another in the fore-aft dimension of the machine 10 or a lateral dimension of the machine 10, or both dimensions, illustratively in the lateral dimension.

The plenum box 26 may comprise a plenum inlet port 38 coupled fluidly to the precleaner outlet port 34 via, for example, the intake tube 27 and a plenum outlet port 40 coupled fluidly to the filter inlet port 36. The plenum inlet and outlet ports 38, 40 may be offset from one another in the fore-aft dimension or the lateral dimension, or both dimensions, illustratively in the lateral dimension. The precleaner outlet port 34 and the plenum inlet port 38 may be aligned vertically with one another, and the plenum outlet port 40 and the filter inlet port 36 may be aligned vertically with one another.

The plenum box 26 is configured to divert flow of intake air received from the precleaner 22 laterally (i.e., in the lateral dimension) to the filter 24, as indicated by dashed flow arrow 42, in such a way as to promote operator visibility. It further provides a mounting platform for the precleaner 22.

The plenum box 26 defines a plenum chamber 44 between the plenum inlet port 38 and the plenum outlet port 40. The plenum box 26 has a plurality of flat walls joined to define the plenum chamber 44. The plurality of flat walls comprise a horizontal plenum top wall 46 in which the plenum inlet port 38 is located and is defined thereby, a horizontal plenum bottom wall 48 in which the plenum outlet port 40 is located, a vertical front wall 50 (FIG. 4) secured to the plenum top and bottom walls 46, 48, a vertical rear wall 52 secured to the plenum top and bottom walls 46, 48, a vertical laterally outer side wall 54 secured to the plenum top and bottom walls 46, 48 and the front and rear walls 50, 52, a vertical laterally inner side wall 56 secured to the plenum bottom wall 48 and the front and rear walls 50, 52, and an inclined wall 58 secured to the plenum top wall 46, the inner side wall 56, and the front and rear walls 50, 52. The plenum box 26 thus forms a compact structure, minimizing obstruction to visibility.

An opening 92 may be formed in the wall 48. The opening 92 may be used to route wiring therethrough to power a powered precleaner mounted atop the plenum box 26 in place of the precleaner 22. In the case of a non-powered precleaner 22, a plug 59 may be positioned in the opening 92 to close the opening 92. In other embodiments, the wall 48 may be formed without the opening 92 so as to be solid in that area.

The walls of the plenum box 26 may be constructed of pieces of sheet metal (e.g., low-carbon steel). For example, as illustrated, the plenum top wall 46 and the inclined wall 58 may be included in a first formed one-piece member, the plenum bottom wall 48 and the outer side wall 54 may be included in a second formed one-piece member, and the inner side wall 56 may comprise a first plate 60a included in the second formed one-piece member and a second plate 60b overlapping the first plate 60a and included in the first formed one-piece member. Further, the front and rear walls 50, 52 may be separate one-piece members. During manufacture, the one-piece members may be joined in any suitable manner, such as, for example, welding.

The wall 58 is inclined so as not only to direct flow of intake air toward the plenum outlet port 40, but also to minimize obstruction to visibility, such as along the fore-aft midline 30. The inclination of the wall 58 thus helps to provide the plenum box 26 with a "low profile." Illustratively, the inclined wall 58 slopes downwardly away from the precleaner 22 toward the fore-aft midline 30, and crosses the fore-aft midline 30 (FIG. 3). In other embodiments, the inclined wall 58 may be offset from the fore-aft midline 30 between the precleaner 22 and the fore-aft midline 30 and still offer visibility benefits.

In yet other embodiments, the plenum box 26 may be constructed without the inclined wall 58. In such a case, the top wall 46 may be extended horizontally, rather than inclined, until it meets vertical inner side wall 56, so as to form a 90 degree angle between the walls 46 and 56.

The plenum box 26 is mounted to a housing top wall 62 of the housing 28 in an opening 64 defined therein via, for example, welding of the plenum box 26 to the wall 62. The plenum box 26 is positioned within the opening 64 such that a portion of the plenum box 26 is above the housing top wall 62 so as to be outside the external housing 28 and a portion of the plenum box 26 is below the housing top wall 62 so as to be inside the external housing 28 within the engine compartment 15. The plenum top wall 48 and the inclined wall 58 are above the housing top wall 62. The plenum bottom wall 48 and the inner side wall 56 are below the housing top wall 62. The housing top wall 62 may be the hood of the engine compartment 15, in which case it may be said that the plenum box 26 is integrated into the hood. Such hood integration of the compact plenum box 26 not only promotes operator visibility but also has aesthetic benefits.

The precleaner 22 is mounted to the top wall 46 of the plenum box 26. The precleaner 22 is mounted atop the intake tube 27 which routes partially cleaned intake air from the precleaner outlet port 34 to the plenum inlet port 38. The tube 27 is fixed (e.g., welded) to a mounting plate 74. A gasket 76

(e.g., a non-asbestos fiber gasket, or elastomeric gasket such as rubber gasket) for sealing at relatively low fluid pressures is sandwiched between the mounting plate 74 and the plenum top wall 46 so as to establish a sealed connection therebetween. A number of fasteners 78 (e.g., four), in the form of, for example, threaded bolts and associated nuts, extend through the mounting plate 74, gasket 76, and plenum top wall 46 to secure the tube 27 and precleaner 22 to the plenum box 26.

The air filter 24 is secured to the plenum box 26. A grommet 66, made of, for example, an elastomeric material (e.g., rubber), is secured to the plenum bottom wall 48 at an opening 68 defined therein. The grommet 66 is positioned within the opening 68, and its inner diameter defines the plenum outlet port 40. The grommet 66 receives a tube 70 in the plenum outlet port 40 such that the outer diameter of the tube 70 mates with the inner diameter of the grommet 66, establishing a sealed connection therebetween. The tube 70 is secured to and extends from a housing of the air filter 24 and defines a short channel for conducting intake air from the plenum chamber 44 to the air filter 24.

In use, ambient air enters the precleaner 22, which separates relatively heavy particles or other particles from the air by centrifugal force. The air is then routed from the precleaner outlet port 34 through plenum inlet port 38 to the plenum chamber 44. The plenum chamber 44 diverts the air (e.g., laterally inwardly) to the plenum outlet port 40. The air is then routed to the filter inlet port 36 for filtration of relatively light particles or other particles by the filtration media of the filter 24 inside the housing 28. The cleaned air is subsequently routed to the engine 14. The plenum box 26 thus accommodates the offset between the precleaner 22 and the filter 24 in a manner that promotes the visibility of the operator and relatively efficient use of space.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A work machine, comprising:
an external housing,
an air precleaner positioned outside the external housing, the air precleaner comprising a precleaner outlet port,
an air filter positioned inside the external housing, the air filter comprising a filter inlet port, the precleaner outlet port and the filter inlet port offset from one another in a fore-aft dimension of the work machine or a lateral dimension of the work machine, or both dimensions, and
a plenum box coupled fluidly to the precleaner outlet port and the filter inlet port for communication of intake air from the air precleaner to the air filter through the plenum box.

2. The work machine of claim 1, wherein the plenum box comprises a plenum inlet port coupled fluidly to the precleaner outlet port and a plenum outlet port offset from the plenum inlet port in the fore-aft dimension or the lateral dimension, or both dimensions, and coupled fluidly to the filter inlet port.

3. The work machine of claim 2, wherein the precleaner outlet port and the filter inlet port are offset from one another in the lateral dimension of the work machine, and the plenum inlet port and the plenum outlet port are offset from one another in the lateral dimension of the work machine.

4. The work machine of claim 3, wherein the precleaner outlet port and the plenum inlet port are aligned vertically with one another, and the plenum outlet port and the filter inlet port are aligned vertically with one another.

5. The work machine of claim 2, wherein the plenum inlet port and the plenum outlet port are offset from one another in the lateral dimension of the work machine.

6. The work machine of claim 2, wherein the plenum box comprises a plurality of flat walls joined to define a plenum chamber between the plenum inlet port and the plenum outlet port, at least one of the plurality of flat walls being inclined.

7. The work machine of claim 6, wherein the air precleaner is offset laterally from a fore-aft midline of the work machine, and the inclined wall slopes downwardly away from the air precleaner toward the fore-aft midline.

8. The work machine of claim 2, wherein the plenum box comprises a plenum bottom wall, defining an opening, and a grommet secured to the plenum bottom wall and positioned within the opening so as to define the plenum outlet port which receives a tube secured to the air filter.

9. The work machine of claim 1, wherein the external housing comprises a housing top wall, and the plenum box is mounted to the housing top wall.

10. The work machine of claim 9, wherein the housing top wall defines an opening, and the plenum box is positioned within the opening such that a portion of the plenum box is above the housing top wall so as to be outside the external housing and a portion of the plenum box is below the housing top wall so as to be inside the external housing within an engine compartment of the work machine.

11. A work machine, comprising:
an external housing,
an air precleaner positioned outside the external housing, the air precleaner comprising a precleaner outlet port,
an air filter positioned inside the external housing, the air filter comprising a filter inlet port, the precleaner outlet port and the filter inlet port offset from one another in a fore-aft dimension of the work machine or a lateral dimension of the work machine, or both dimensions, and
a plenum box coupled fluidly to the precleaner outlet port and the filter inlet port for communication of intake air from the air precleaner to the air filter through the plenum box, wherein the plenum box comprises a plenum inlet port coupled fluidly to the precleaner outlet port and a plenum outlet port offset from the plenum inlet port in the fore-aft dimension or the lateral dimension, or both dimensions, and coupled fluidly to the filter inlet port, the plenum box comprises a plurality of flat walls joined to define a plenum chamber between the plenum inlet port and the plenum outlet port, and the plurality of flat walls comprise a horizontal plenum top wall in which the plenum inlet port is located, a horizontal plenum bottom wall in which the plenum outlet port is located, a vertical front wall secured to the plenum top and bottom walls, a vertical rear wall secured to the plenum top and bottom walls, a vertical laterally outer side wall secured to the plenum top and bottom walls and the front and rear walls, a vertical laterally inner side wall secured to the plenum bottom wall and the front and rear walls, and an inclined wall secured to the plenum top wall, the inner side wall, and the front and rear walls.

12. The work machine of claim 11, wherein the external housing comprises a housing top wall, the plenum top wall and the inclined wall are above the housing top wall, and the plenum bottom wall and the inner side wall are below the housing top wall.

13. The work machine of claim 11, wherein the plenum top wall and the inclined wall are included in a formed one-piece member.

14. The work machine of claim 11, wherein the plenum bottom wall and the outer side wall are included in a formed one-piece member.

15. The work machine of claim 11, wherein the inner side wall comprises a first plate and a second plate overlapping the first plate.

16. The work machine of claim 11, wherein the plenum top wall and the inclined wall are included in a first formed one-piece member, the plenum bottom wall and the outer side wall are included in a second formed one-piece member, and the inner side wall comprises a first plate included in the second formed one-piece member and a second plate overlapping the first plate and included in the first formed one-piece member.

* * * * *